April 21, 1970     J. L. LA FLEUR     3,507,466
AIRCRAFT UNDERCARRIAGE
Filed March 11, 1968     5 Sheets-Sheet 1
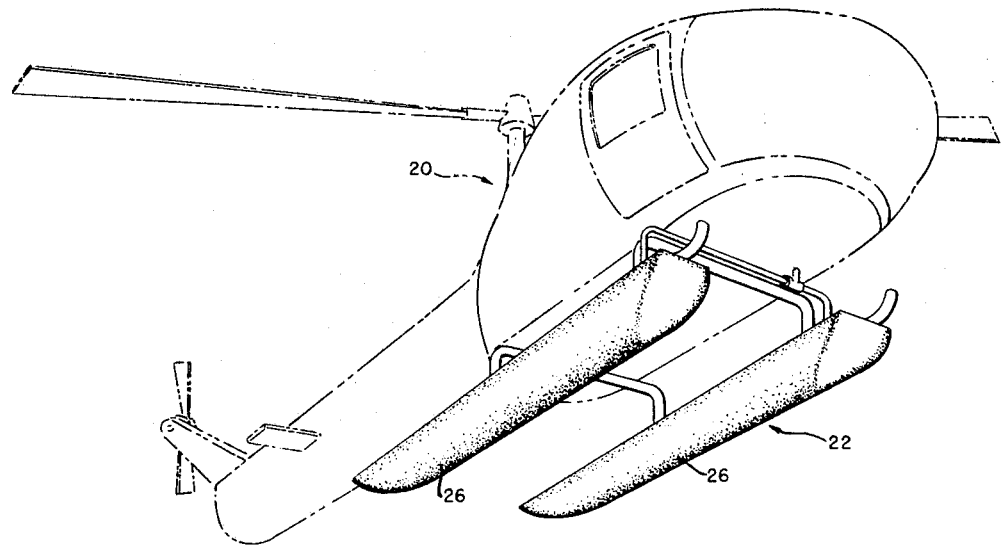
FIG. 1
FIG. 2
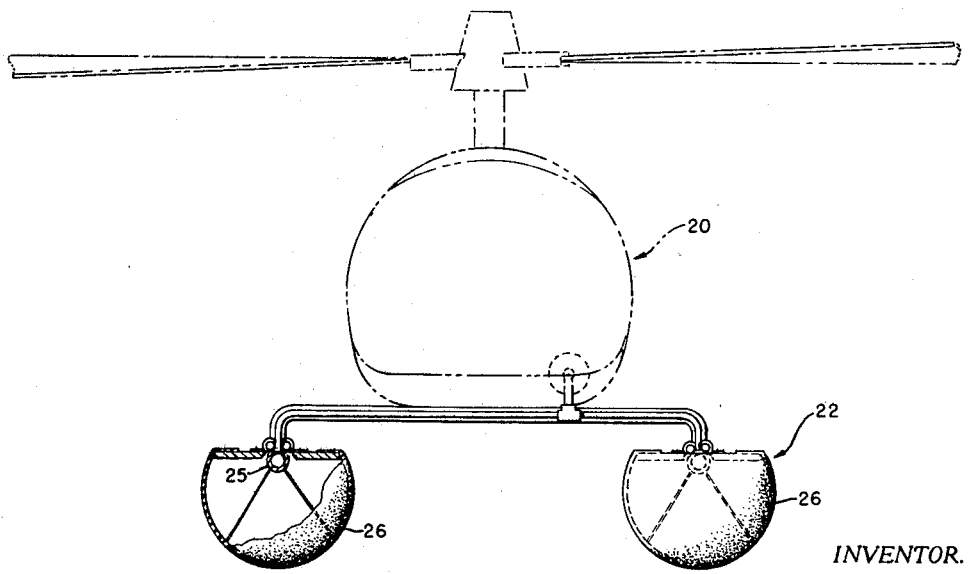
INVENTOR.
JEAN L. LaFLEUR
BY
Bean & Bean
ATTORNEYS

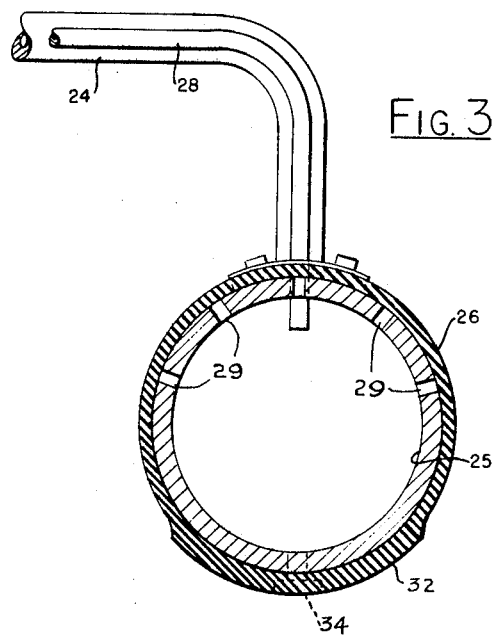
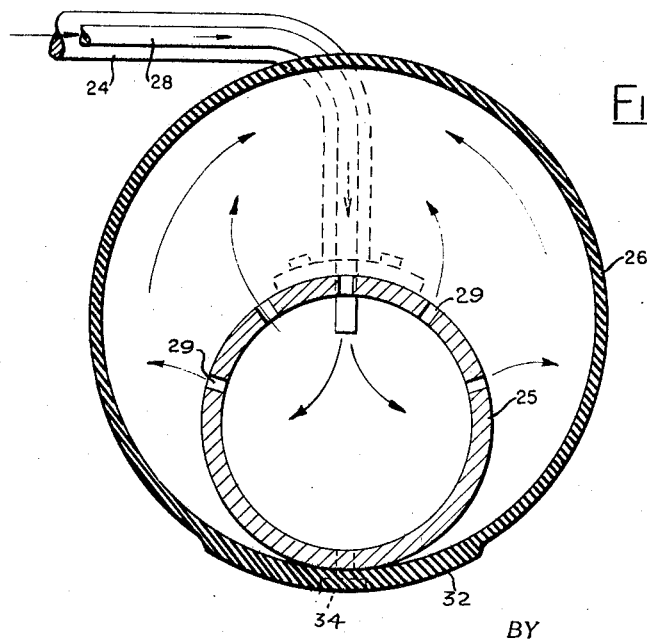

April 21, 1970     J. L. LA FLEUR     3,507,466

AIRCRAFT UNDERCARRIAGE

Filed March 11, 1968     5 Sheets-Sheet 2

INVENTOR.
JEAN L. LaFLEUR

BY Bean + Bean
ATTORNEYS

April 21, 1970 J. L. LA FLEUR 3,507,466
AIRCRAFT UNDERCARRIAGE
Filed March 11, 1968 5 Sheets-Sheet 4
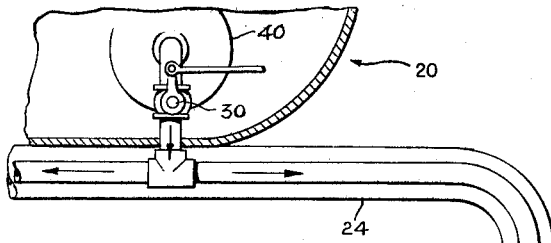
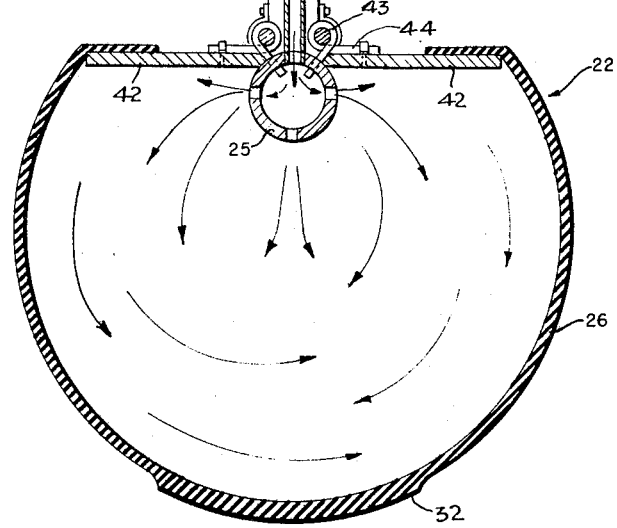
FIG. 10
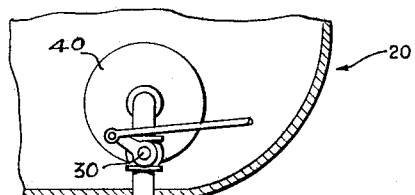
FIG. 11
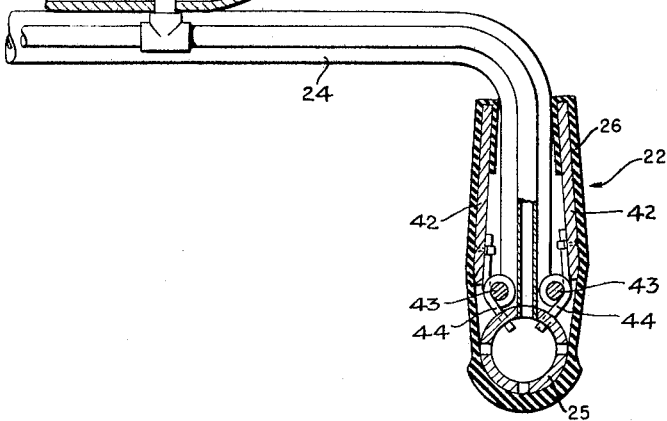
INVENTOR.
JEAN L. LaFLEUR
BY
*Bean&Bean*
ATTORNEYS April 21, 1970   J. L. LA FLEUR   3,507,466
AIRCRAFT UNDERCARRIAGE
Filed March 11, 1968   5 Sheets-Sheet 5
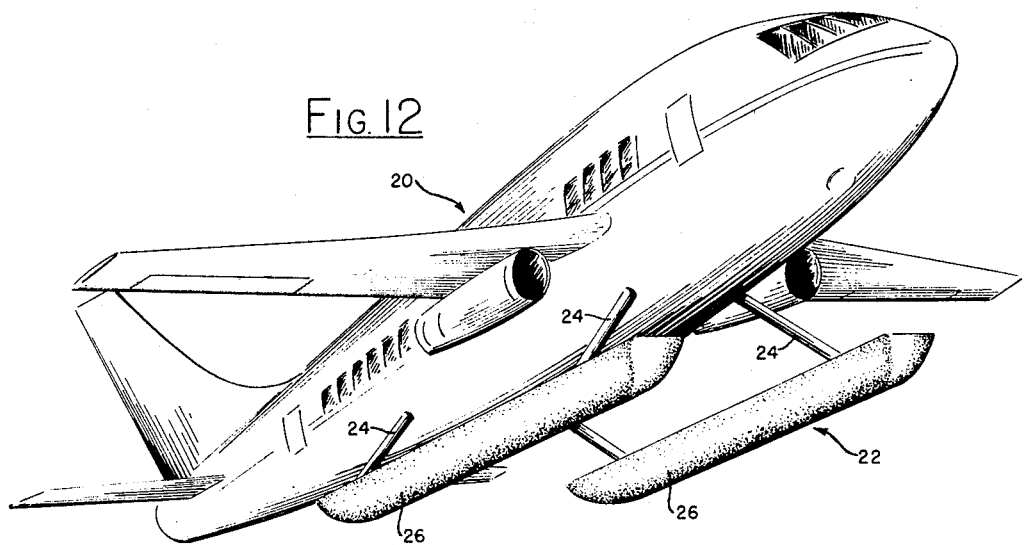
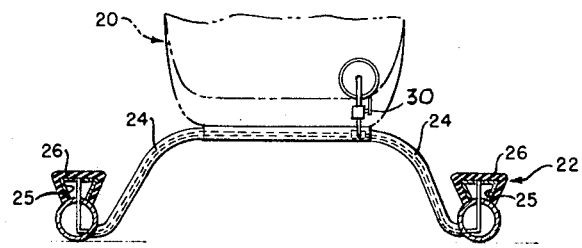
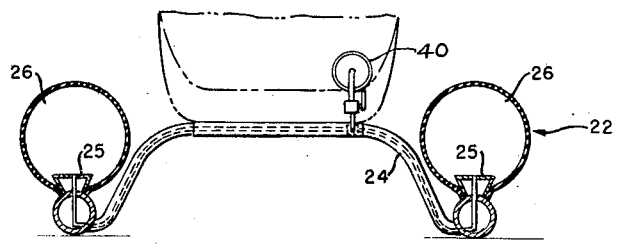
INVENTOR.
JEAN L. LaFLEUR
BY
*Bean & Bean*
ATTORNEYS

United States Patent Office 3,507,466
Patented Apr. 21, 1970

3,507,466
AIRCRAFT UNDERCARRIAGE
Jean L. La Fleur, Chippawa, Ontario, Canada, assignor to Bell Aerospace Corporation, Wheatfield, N.Y.
Filed Mar. 11, 1968, Ser. No. 712,258
Int. Cl. B64c 25/56
U.S. Cl. 244—105                              7 Claims

ABSTRACT OF THE DISCLOSURE

An aircraft undercarriage or "landing gear" means applicable to helicopter or fixed wing or "VTO" type aircraft or the like; thereby adapting such craft to "land," taxi, and takeoff from land or water surfaces or the like in improved manner. The invention features an improved float type undercarriage mechanism employing, in combination, a spar structure mounting thereon an inflatable envelope formed of elastic material; and means for alternately inflating the envelope into operative condition, and deflating it so that it resiliently contracts and hugs itself to the supporting spar member, thereby minimizing aerodynamic drag effects thereon without requiring use of auxiliary envelope retracting and/or fabric folding and/or compaction devices.

BACKGROUND OF THE INVENTION

Whereas inflatable-retractable pontoon devices have been previously designed for buoyant support of aircraft on water, such devices have been fabricated of non-elastic sheet material, and the arrangements for retracting the material when deflated into the aircraft frontal profile, to prevent excessive aerodynamic drag during flight, such as disclosed in U.S. Patent 3,297,280 for example, have been inordinately complicated and weighty and space-consuming and/or otherwise objectionable. It is the primary object of the present invention to provide an improved form of elastic inflatable-deflatable undercarriage means for air-supported craft. Another object is to provide an improved elastic self-retracting buoyant undercarriage for aircraft. Still another object is to provide an improved inflatable undercarriage for emergency use in aircraft.

IN THE DRAWINGS

By way of example the invention is illustrated as being embodied in aircraft as shown in the accompanying drawing, wherein:

FIG. 1 is a bottom front perspective view of a helicopter type aircraft provided with a parallel pontoon type undercarriage system of the present invention;

FIG. 2 is a front elevational view of a helicopter aircraft as in FIG. 1, with a portion of one of the pontoons shown in section to illustrate one form of the invention;

FIG. 3 is a fragmentary vertical sectional view through a modified form of undercarriage envelope construction of the invention when in its deflated condition;

FIG. 4 is a sectional view corresponding to FIG. 3 but showing the system thereof when in inflated condition;

FIG. 10 is a view corresponding to FIG. 4 but showing a form of undercarriage envelope construction such as shown in FIG. 2, while in envelope-inflated, operative condition;

FIG. 11 is a view corresponding to FIG. 10 but illustrating the system in deflated-retracted condition;

FIG. 12 is a bottom front perspective view illustrating the invention as applied to a fixed wing type aircraft;

FIG. 13 is a view corresponding to FIGS. 3, 9, 11, but showing a modified form of undercarriage device when in deflated condition; and FIG. 14 is a view corresponding to FIG. 13 but illustrating the undercarriage device in its envelope-inflated, operative condition.

Figure 5:
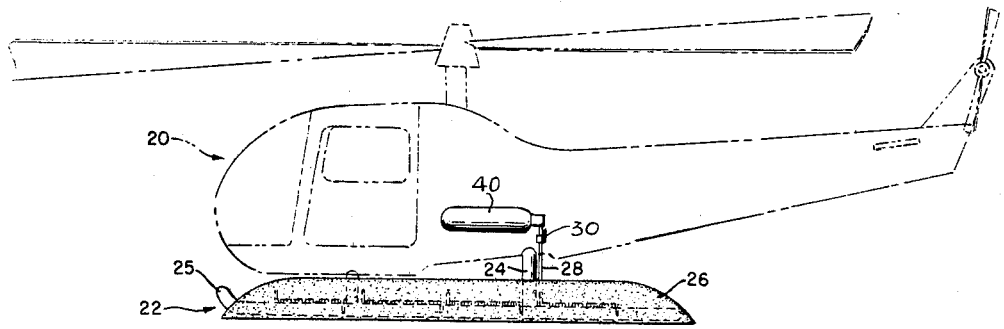
FIG. 5 is a side elevational view corresponding to FIGS. 3, 4, and showing the undercarriage in inflated buoyant-support condition.

As shown in the drawing herewith, the invention may be embodied in an aircraft of the fixed wing or helicopter types comprising in any case a fuselage 20 and an undercarriage as indicated generally at 22. The undercarriage arrangements as shown are of the dual pontoon type; comprising two or more transverse support legs or struts 24—24 which are suitably anchored to the fuselage and suspend from their lower ends parallel spars 25—25 which, in each case, provides the "backbone" support for an inflatable envelope device as indicated generally at 26. Typically, the strut and spar members are fabricated of standard aircraft type structural tubing, or the like. The strut members are arranged to convey, under pilot-control, from a suitable source carried within the fuselage, a regulated supply of compressed air to the interiors of the envelopes 26; either by utilizing the hollow interiors of the struts 24 or by separate conduits as indicated at 28 which may be carried either externally or internally of the struts.

As shown in FIGS. 3, 4, a cell device of the invention may be constructed to comprise an elastic envelope of elongate balloon-like form as indicated at 26, made of sheet material which is highly elastic in one direction and is carried by a longitudinally disposed spar member 25; the sheet material being so arranged that the direction of its elasticity extends girthwise of the cell structure. The spars 25 are apertured as indicated at 29 so as to deliver compressed air from the conduits 28 into the interiors of the envelopes 26, under control of the aircraft pilot, as by means of a remotely controlled valve such as is illustrated at 30. Thus, it will be understood that inflation of the cells 26—26 into the configuration illustrated at FIGS. 4, 5, will provide buoyancy support means extending lengthwise below the aircraft for landing, taxiing, and/or take-off purposes relative either to land or water surfaces. The envelope sheet structures are preferably armored with some wear resistant covering material as indicated at 32 to withstand wearing stresses encountered thereby when landing on ground surfaces. The envelope material may be anchored to the spars by any suitable means such as indicated at 34 (FIGS. 3–4).

It is a particular feature of the present invention that the sheet material forming the envelope structures 26 is fabricated so as to be highly elastic in the direction extending girthwise of the envelope structure. Hence, whenever the envelope is deflated; such as by reverse operation of the valve 30 thereby permitting exhaust of all air from the envelope, the resiliency of the sheet material per se will cause the envelope to contract and to retire compactly into hugging relation against the support spar 25 as shown in FIG. 3 of the drawing herewith. Thus the entire envelope sheet structure draws itself tightly into the spar profile conforming configuration shown at FIG. 3; the wear-resistant portions 32 thereof being now disposed to hug the bottom of the spar 25 and thereby protecting the latter against abrasion effects. Thus, it will be appreciated that, by virtue of the present invention when the aircraft is in flight the envelope structures may be permitted to retract into configurations providing minimum aerodynamic drag effects simply by adjustment of the valve 30 to permit exhaust of the air from the cells 26. Then, preliminary to a landing operation, the pilot causes valve 30 to open so as to deliver compressed air into the envelope structures, whereupon they quickly inflate to their operative configurations such as illustrated at FIGS. 4, 5.

Figure 6:
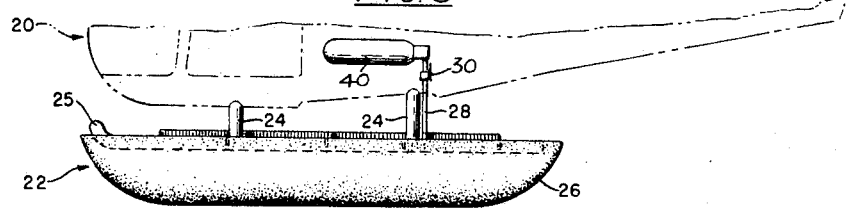
FIG. 6 is a side elevational view corresponding to FIG. 5 but illustrating a modified form of pontoon arrangement.

FIG. 6 illustrates another form of undercarriage arrangement of the invention wherein the envelope structure 26 is fixed along its upper ceiling portion to the spar 25 as by means of any suitable fastening devices (not shown). Thus, in this arrangement the cell structures 26—26 depend from the spars when inflated, and thereby provide the requisite buoyance effects for supporting the aircraft on water surfaces. When deflated the envelope structures will of course closely hug the aerodynamic profiles of the spars 25 as explained hereinabove for flight efficiency purpose, and furthermore adapt the undercarriage system to landings on ground surfaces or the like by virtue of the fact that the portion 32 of the envelope structure armorplates the spar members 25 against abrasive damage.

Figure 7:
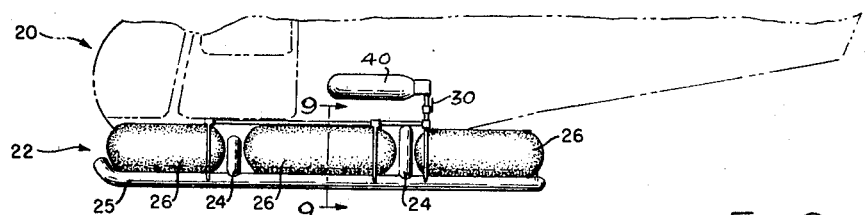
FIG. 7 is a side elevational view corresponding to FIGS. 5, 6, but showing still another form of pontoon arrangement.

FIGS. 5-7 illustrate cell arrangements as discussed hereinabove, and furthermore illustrates how the source of compressed air for inflating the envelopes may comprise a compressed air cylinder or the like as indicated at 40. However, it is to be understood that in lieu thereof the compressed air may be furnished of any other conveniently available source such as by a special air pump or from the compressor section of an engine comprising an essential component of the aircraft per se. FIG. 7 also illustrates the use of a plurality of smaller envelopes, each being designated 26, arranged in longitudinal alignment on top of the spar 25. These cells are dimensioned and located so as to fit in between the struts 24—24, and are fixed along their bottom edges to the spar 25 by any suitable fastening devices.

Figure 8:
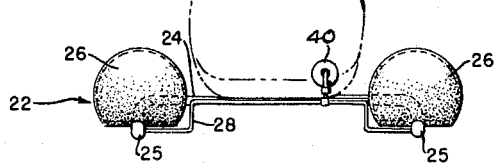
FIG. 8 is a front elevational view corresponding to FIG. 7.
Figure 9:
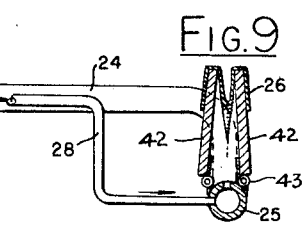
FIG. 9 is a fragmentary sectional view taken on line 9—9 of FIG. 7, but showing the envelope in deflated-retracted condition.

FIGS. 8, 9, illustrate a modified form of envelope arrangement wherein plates 42—42 are hingedly connected as indicated at 43—43 to the spar 25 to form portions of the envelope wall structure. The elastic sheet material is cemented or otherwise fixed to the plates 42—42 so as to balloon out when inflated to the form shown at FIG. 8. When deflated, the elasticity characteristics of the material causes it to contract the hinge plates upwardly and into closely compacted condition as shown in FIG. 9.

FIGS. 2, 10, 11, illustrate still another form of envelope arrangement utilizing hinge plates 42—42 as in FIGS. 8, 9; but show the envelopes as being suspended below the spars 25 when inflated. Also, springs 44—44 are shown as being employed to assist in folding the hinge plates towards one another when the envelopes are deflated. FIGS. 13, 14, illustrate another modification wherein the spar members 25 are shown to be generally of triangular sectional form and are affixed along their lower edges to tubular skid members 50—50 which are carried at the lower ends of the struts 24—24. The resilient sheet material from which the envelopes 26 are fabricated is affixed along its lower edges as by cementing or the like to the lower side portions of the spars 25. The resilient sheeting is dimensioned so as to conform closely to the sectional profile of the spar members 25 when the envelopes are in deflated condition as shown for example at FIG. 13. However, upon inflation of the envelopes 26—26 they balloon upwardly into the enlarged diameter form illustrated at FIG. 14; thereby providing the requisite buoyancy facilities for the aircraft when landing on a water surface.

It will of course be understood that whereas only a few forms of the invention have been illustrated and described in detail hereinabove, it will be understood that various changes may be made therein without departing from the spirit of the invention.

I claim:
1. An aircraft undercarriage arrangement including an inflatable-deflatable envelope member disposed beneath the aircraft for support thereof relative to water surfaces or the like;

said envelope member comprising a generally closed elongate cell device formed of elastic and substantially air-impervious sheet material positionally mounted relative to the aircraft by means of a strut and spar device extending rigidly from the aircraft;

said spar device extending generally longitudinally of said envelope member and thereby providing a shape-reinforcing backbone device for said envelope member;

the elastic sheet material of said envelope member being affixed at portions thereof to said spar device;

said spar device having conduit means associated therewith intercommunicating the interior of said envelope member with fluid pressure supply means and exhaust means for alternatively supplying pressurized fluid thereto and permitting exhaust of fluid therefrom;

and conduit control means operable by the aircraft pilot whereby said envelope member may alternatively be elastically inflated to provide bouyant support for the aircraft relative to a water surface or the like and deflated so as to elastically contract into spar-hugging form for flight aerodynamic efficiency purposes.

2. An aircraft undercarriage arrangement as set forth in claim 1 wherein said envelope forming sheet material is substantially elastic only in the girthwise direction of the envelope.

3. An aircraft undercarriage arrangement as set forth in claim 2, wherein said spar device and said envelope member are of generally tubular configuration, and said envelope member is fixed to said spar device along a line extending lengthwise thereof.

4. An aircraft undercarriage arrangement as set forth in claim 3, wherein said envelope member and said spar device are fixed together adjacent the bottoms thereof, and the bottom of said envelope member is armored so as to withstand wear stresses.

5. An aircraft undercarriage arrangement as set forth in claim 4, wherein said conduit means incldues a hollow interior portion of said spar device, and said spar device is apertured to afford fluid communication between said hollow interior portion thereof and the interior of said envelope member.

6. An aircraft undercarriage arrangement as set forth in claim 1 wherein said conduit means comprises a hollow interior portion of said spar device.

7. An aircraft undercarriage arrangement as set forth in claim 1 wherein said conduit means compirses a separate fluid conducting device attached to and carried by said strut and spar devices.

References Cited

UNITED STATES PATENTS 3,004,737 10/1961 Boyle et al. _____ 244—105 XR
3,102,705 9/1963 Namsick _____ 244—105 XR MILTON BUCHLER, Primary Examiner P. E. SAUBERER, Assistant Examiner U.S. Cl. X.R.
244—17.17, 102